United States Patent
Jacobi et al.

(10) Patent No.: US 9,250,915 B2
(45) Date of Patent: Feb. 2, 2016

(54) OPERAND FETCHING CONTROL AS A FUNCTION OF BRANCH CONFIDENCE

(71) Applicant: International Business Machines Corporation, Armonk, NY (US)

(72) Inventors: Christian Jacobi, Schonaich (DE); Barry W. Krumm, Poughkeepsie, NY (US); Brian R. Prasky, Wappingers Falls, NY (US); Martin Recktenwald, Steinenbronn (DE); Chung-Lung K. Shum, Wappingers Falls, NY (US); Charles F. Webb, Wappingers Falls, NY (US); Joshua M. Weinberg, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 13/652,544

(22) Filed: Oct. 16, 2012

(65) Prior Publication Data

US 2013/0091343 A1    Apr. 11, 2013

Related U.S. Application Data

(63) Continuation of application No. 12/822,379, filed on Jun. 24, 2010.

(51) Int. Cl.
  *G06F 9/38* (2006.01)
  *G06F 9/30* (2006.01)
(52) U.S. Cl.
  CPC .......... *G06F 9/3824* (2013.01); *G06F 9/30043* (2013.01); *G06F 9/3806* (2013.01); *G06F 9/3844* (2013.01); *G06F 9/3857* (2013.01)

(58) Field of Classification Search
  None
  See application file for complete search history.

(56) References Cited

U.S. PATENT DOCUMENTS

| 2008/0148026 A1 | 6/2008 | Dhodapkar et al. |
| 2009/0150657 A1 | 6/2009 | Gschwind et al. |
| 2009/0177858 A1 | 7/2009 | Gschwind et al. |
| 2009/0193231 A1 | 7/2009 | Gschwind et al. |

OTHER PUBLICATIONS

Haitham Akkary, Srikanth T. Srinivasan, Rajendar Koltur, Yogesh Patil, and Wael Refaai. "Perceptron-Based Branch Confidence Estimation" Software, IEE Proceedings, Feb. 14-18 2004.*

Uht, A. K., and Sindagi, V. Disjoint Eager Execution: An Optimal Form of Speculative Execution. Proceedings of the 28th International Symposium on Microarchitecture, IEEE, pp. 313-325; Nov./Dec. 1995.

* cited by examiner

*Primary Examiner* — Jacob A Petranek
(74) *Attorney, Agent, or Firm* — Cantor Colburn LLP; Margaret McNamara (57) ABSTRACT

Data operand fetching control includes calculating a summation weight value for each instruction in a pipeline, the summation weight value calculated as a function of branch uncertainty and a pendency in which the instruction resides in the pipeline relative to other instructions in the pipeline. The data operand fetching control also includes mapping the summation weight value of a selected instruction that is attempting to access system memory to a memory access control. Each memory access control specifies a manner of handling data fetching operations. The data operand fetching control further includes performing a memory access operation for the selected instruction based upon the mapping.

9 Claims, 5 Drawing Sheets

| ENTRY | CYCLE 0 | | CYCLE 1-(ALT) (B3 RESOLVES) | |
|---|---|---|---|---|
| | UV | SW | UV | SW |
| LA | 0 | 0 | 0 | 0 |
| B1 | 3 | 3 | 3 | 3 |
| LB | 0 | 3 | 0 | 3 |
| B2 | 10 | 13 | 10 | 13 |
| LC | 0 | 13 | 0 | 13 |
| B3 | 15 | 28 | 0 | 13 |
| LD | 0 | 28 | 0 | 13 |
| B4 | 2 | 30 | 2 | 15 |
| LE | 0 | 30 | 0 | 15 |

FIG. 4B 400A 410

| ENTRY | CYCLE 0 | | CYCLE 1 (B1 RESOLVES) | |
|---|---|---|---|---|
| | UV | SW | UV | SW |
| LA | 0 | 0 | 0 | 0 |
| B1 | 3 | 3 | 0 | 0 |
| LB | 0 | 3 | 0 | 0 |
| B2 | 10 | 13 | 10 | 10 |
| LC | 0 | 13 | 0 | 10 |
| B3 | 15 | 28 | 15 | 25 |
| LD | 0 | 28 | 0 | 25 |
| B4 | 2 | 30 | 2 | 27 |
| LE | 0 | 30 | 0 | 27 |

OPERAND FETCHING CONTROL AS A FUNCTION OF BRANCH CONFIDENCE

CROSS-REFERENCE TO RELATED APPLICATION

This application is a continuation of U.S. patent application Ser. No. 12/822,379 filed Jun. 24, 2010, the disclosure of which is incorporated by reference herein in its entirety.

BACKGROUND

This invention relates generally to computer processing, and more specifically, to operand fetching control as a function of branch confidence.

The need for increasing processor performance in the past has relied on a combination of microarchitecture improvements along with technology improvements. With a requirement to hold constant, or even reduce, the power/wattage envelope of a microprocessor, a transition is taking place from single thread performance to overall chip performance. While there are different balances across different markets, the general direction of multiple processor threads on a chip is becoming more prevalent in order to achieve an overall performance advantage to the customer. The threads may be evident as multiple cores on a chip and/or multiple threads on a core (e.g., SMT).

When placing more threads on a chip, the shared cache/memory bandwidth requirements increase at a faster rate than what is required for increasing the performance of a single thread. For increasing the number of cores, the cache/memory bandwidth requirements can be considered to increase with respect to the number of cores being added.

With the additional cache/memory bandwidth (for both shared on-chip cache and off-chip cache/memory), there becomes a need to control how fetching operations utilize the bandwidth (e.g., prioritization of operations) that is made available to them.

BRIEF SUMMARY

An exemplary embodiment is a computer-implemented method for implementing data operand fetching control. The method includes calculating a summation weight value for each instruction or group of instructions in the computer processor pipeline, the summation weight value calculated as a function of branch uncertainty and a pendency in which the instruction or group of instructions reside in the computer processor pipeline relative to other instructions in the computer processor pipeline. The method also includes mapping the summation weight value of a selected instruction that is attempting to access system memory to one of a number of pre-defined memory access controls, each of the pre-defined memory access controls specifying a manner of handling data fetching operations. The method further includes performing a memory access operation for the selected instruction based upon the mapping.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to operand fetching control as a function of branch confidence. The exemplary operand fetching control processes enable a processor to prioritize and reduce the data cache memory bandwidth requirements on a thread level.

In one exemplary embodiment, the operand fetching control processes utilize a summation weight value for a branch instruction or group of instructions that include a branch instruction in a computer processor pipeline, which is calculated as a function of branch uncertainty as well as a pendency in which the branch instruction or group of instructions reside in the computer processor pipeline relative to other branch instructions (or groups of instructions that include branch instructions) in the computer processor pipeline. For example, if the pipeline is implemented as an in-order machine, then pendency may be determined by instructions that are located further down the pipeline (i.e., older instructions) than the current branch instruction. If the pipeline is an out-of-order machine, the pendency may be determined by instructions that have resided in the pipeline longer, and are older by program order, than the current branch instruction. In an alternative exemplary embodiment, the operand fetching control processes utilize a summation weight value for each entry in a global completion table, which is calculated as a function of branch uncertainty and branch resolution, which decreases the overall summation value. The summation weight value is mapped to one of a number of pre-defined memory access controls, whereby each of the pre-defined memory access controls specifies a manner of handling data fetching operations subject to instruction path uncertainty as a function of older unresolved prediction types.

Figure 1:
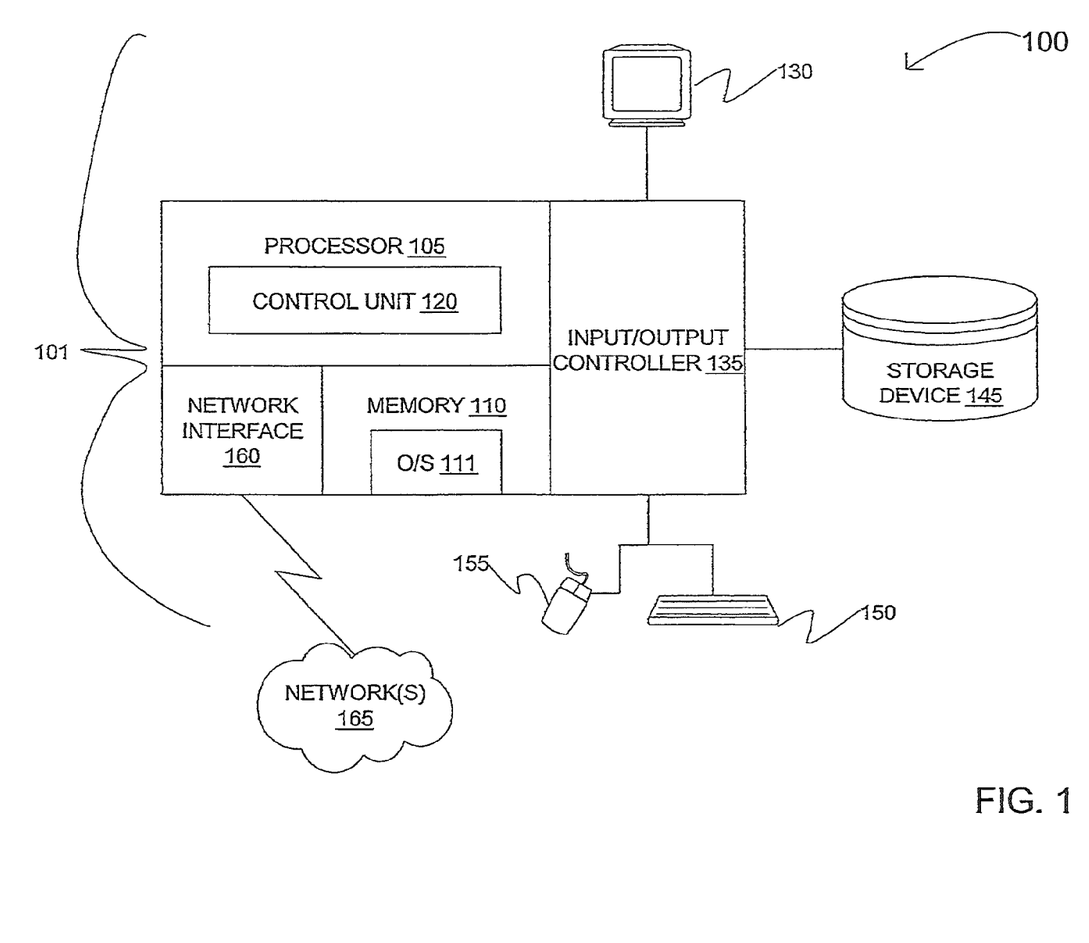
FIG. 1 illustrates a block diagram of a system for implementing operand fetching control according to an exemplary embodiment.

Turning now to FIG. 1 a block diagram of a system 100 for implementing operand fetching control in accordance with exemplary embodiments will now be described. The methods described herein may be implemented in hardware, software, or a combination thereof. In an exemplary embodiment, the methods described herein are implemented in hardware and are part of a processor 105 (e.g., a microprocessor) of a computer system 101. The computer system 101 may be implemented as a special or general-purpose digital computer, such as a personal computer, workstation, minicomputer, or mainframe computer.

In an exemplary embodiment, in terms of hardware architecture, as shown in FIG. 1, the computer system 101 includes the processor 105, memory 110, and one or more input and/or output (I/O) devices or peripherals, such as a display 130, a storage device 145, a mouse 155, and a keyboard 150, that are each communicatively coupled to the computer system 101 via a local input/output controller 135. The input/output controller 135 may be, for example, one or more buses or other wired or wireless connections, and may include elements (omitted in FIG. 1 for simplicity), such as controllers, buffers, drivers, repeaters, and receivers, to enable communications. Further, the I/O controller 135 may include address, control, and/or data connections to enable various communications among the aforementioned components.

The storage device 145 may be internal to the computer system 101 or may be external (e.g., a separate disk drive that is a physically attached and logically addressable by the computer system 101).

The processor 105 includes a hardware component that executes hardware operations and/or software instructions (e.g., instructions stored in memory 110). The processor 105 may be any custom made or commercially available processor, a central processing unit (CPU), an auxiliary processor among several processors associated with the computer system 101, a semiconductor based microprocessor (in the form of a microchip or chip set), a macroprocessor, a microprocessor, or generally any device for executing instructions. The processor 105 may include cache memory (e.g., instruction cache and/or data cache), which is local to the processor 105 (i.e., on-chip memory) and may be implemented as a hierarchical storage system with varying levels of the cache from fastest to slowest (e.g., L1, L2, . . . Ln, whereby L1 is closest to the processor 105). In an exemplary embodiment, the processor 105 includes an operand fetching control unit (also referred to as "control unit") 120 for implementing operand fetching control processes as a function of branch uncertainty, as will be described further herein. In an exemplary embodiment the processor 105 also includes a predictor unit (shown in FIG. 2), as will be described further herein.

The memory 110 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 may have a distributed architecture, where various components are situated remote from one another, but may be accessed by the processor 105. The memory 110 may comprise a higher level of system memory that resides off-chip with respect to the processor 105 or other processors (not shown) (e.g., as generally known in a tiered hierarchical storage system architecture).

The instructions in memory 110 may include one or more separate programs, each of which comprises a listing of executable instructions for implementing logical functions. As illustrated in FIG. 1, instructions in the memory 110 include an operating system (O/S) 111, which controls the execution of other computer programs and provides scheduling, input-output control, file and data management, memory management, and communication control and related services.

In an exemplary embodiment, the system 100 may further include a network interface 160 that provides a communicative coupling between the computer system 101 and one or more networks 165. The network(s) 165 may include an IP-based network for communication between the computer system 101 and any external network devices, e.g., via a broadband or other network connection. The network(s) 165 transmit and receive data between the computer system 101 and external systems. In an exemplary embodiment, network(s) 165 may include a managed IP network administered by a service provider. The network(s) 165 may be implemented in a wireless fashion, e.g., using wireless protocols and technologies, such as WiFi, WiMax, etc. The network(s) 165 may also include a packet-switched network such as a local area network, wide area network, metropolitan area network, Internet network, or other similar type of network environment. The network(s) 165 may include a fixed wireless network, a wireless local area network (LAN), a wireless wide area network (WAN) a personal area network (PAN), a virtual private network (VPN), intranet or other suitable network system and includes equipment for receiving and transmitting signals.

When the computer system 101 is in operation, the processor 105 is configured to execute instructions stored thereon (e.g., the control unit 120) and/or instructions stored within the memory 110, to communicate data to and from the memory 110, and to generally control operations of the computer system 101 pursuant to the instructions. The control unit 120 is described further herein.

In an exemplary embodiment, where the operand fetching control processes are implemented in hardware, these processes may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In an exemplary embodiment, the computer system 101 employs a computer processor instruction pipeline system architecture in which the exemplary operand fetching control processes may be implemented. Pipelining is one specific form of parallelism, where the execution of several instructions can be interleaved on the same hardware. Pipelining can increase instruction execution throughput by performing stages such as fetching, decoding, execution and completion concurrently for multiple instructions in an instruction stream.

Figure 2:
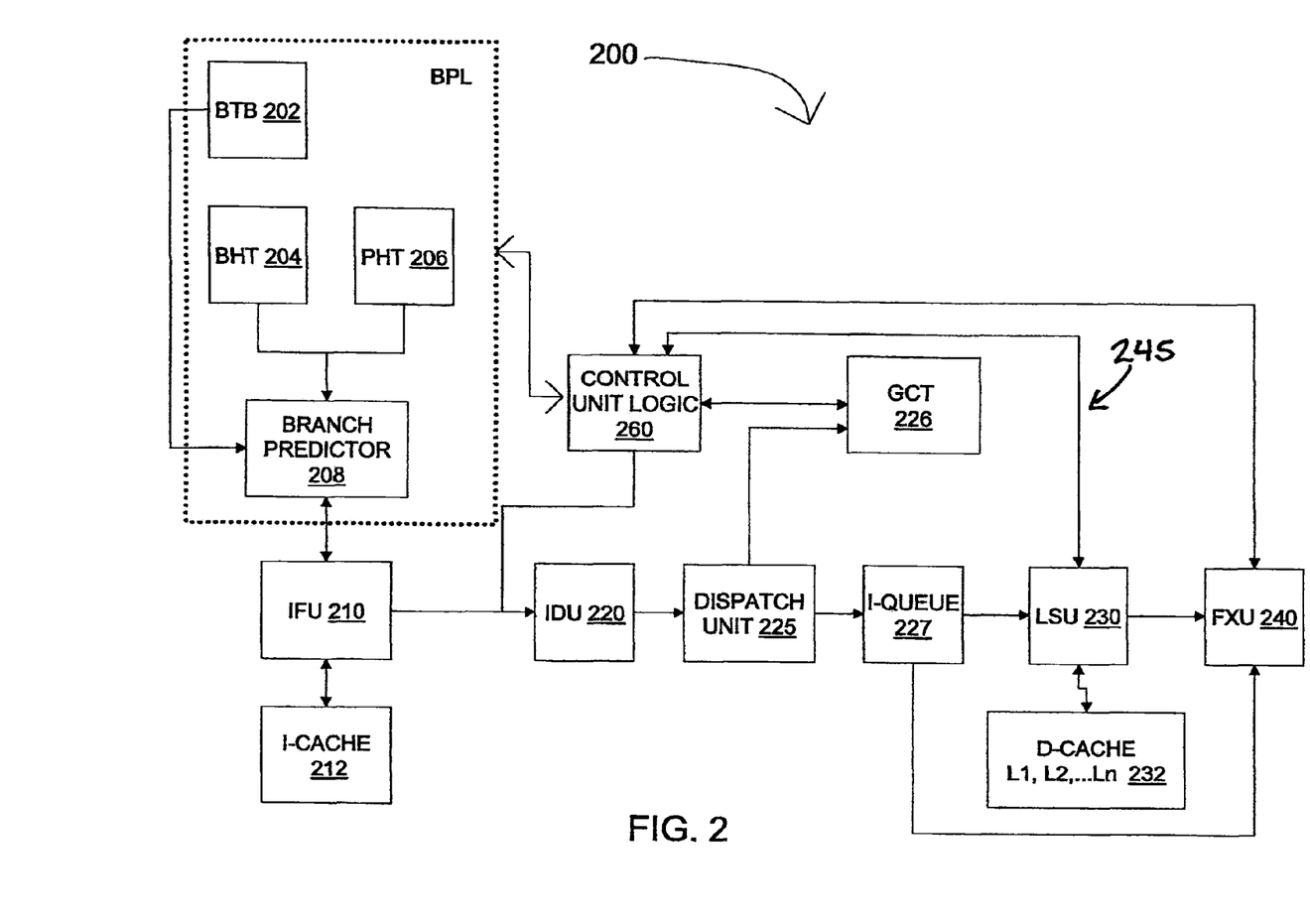
FIG. 2 illustrates a block diagram of a computer processor pipeline architecture for implementing operand fetching control in accordance with an exemplary embodiment.

Turning now to FIG. 2, a computer processor pipeline system (also referred to herein as "pipeline system") 200 for implementing the exemplary operand fetching control processes will now be described. The pipeline system 200 may be implemented as an in-order or out-of-order machine and may include a number of units, such as an instruction fetch unit (IFU) 210, an instruction decode unit (IDU) 220, a dispatch unit 225, an instruction queue (I-queue) 227, a load-store unit (LSU) 230, and an instruction execution unit (FXU) 240. The IFU 210 fetches instructions to be processed, the IDU 220 decodes the instructions, and the dispatch unit 225 dispatches the instructions to the I-queue 227, which in turn feeds these instructions in parallel to the LSU 230 and the FXU 240. The LSU 230 performs any data memory access functions associated with the instruction, and the FXU 240 performs the computational function of the instructions (e.g., arithmetic logic unit (ALU) operations). Multiple communication paths can be used to enable communications among the units 210, 220, 225, 227, 230, and 240, as well as other components of the pipeline system 200. The communication paths may vary in bus width (single-bit to multi-bit) and can be unidirectional or bidirectional.

In an exemplary embodiment, the pipeline system 200 of FIG. 2 is implemented via the processor 105 using multiple pipelined stages, as will now be described. In an exemplary embodiment, the pipeline 200 communicates with a branch prediction unit (also referred to herein as "branch predictor") 208, control unit logic 260, a global completion table (GCT) 226, and storage elements, such as instruction cache (I-cache) 212, and data cache (D-cache) 232.

The branch predictor 208 implements logic (e.g., branch prediction logic (BPL)) in conjunction with constituent components comprising a branch target buffer (BTB) 202, a branch history table (BHT) 204, and a pattern history table (PHT) 206. The branch predictor 208 is implemented to increase the efficiency of the pipeline system 200. A branch predictor allows a prediction as to what stream should be followed for executing instructions without having to wait for the direction of the branch to be resolved and, in the case of a taken branch, a predicted taken branch by the BTB 202 may state the predicted target address of the branch without having to wait for the actual target of the branch to be computed for proceeding. The BTB 202 stores branch instruction addresses and their target addresses and is searched for the next instruction address that contains a branch. On a predicted taken branch, the target address is provided to the IFU 210 for fetching the new target stream.

The BPL may include a 'taken-queue' (not shown) that maintains recently encountered taken branches in order to detect repeating patterns in the current instruction stream. The taken-queue may be updated on BTB 202 hits. Through the branch predictor 208, the BHT 204 allows for direction guessing of a branch based on the past behavior of the direction the branch previously went as a function of the branch address. For example, if the branch is always taken, as is the case of a subroutine return, then the branch will be guessed as taken. The BHT 204 provides high accuracy on those branches which are dominantly resolved in a given direction (i.e., taken/not taken). Thus these dominant branches may be said to have a high confidence value (i.e., highly accurate predictions). However, the BHT 204 is known to be much less accurate in predicting non-dominant branches (which do not reliably exhibit the same direction) as compared with dominant branches. These non-dominant branches may be said to have a low confidence value relative to the dominant branches.

The PHT 206 in conjunction with the branch predictor 208 logic (BPL) is based on paths leading up to the given branch. By basing the prediction value on the path that was taken to get to the given branch, the directionally guessed path is no longer based on the general occurrence for a given branch (i.e., a branch at a given instruction address), but rather a path of taken and not taken branches. The histories of these paths are stored in the PHT 206. PHT branch prediction is typically more reliable in predicting non-dominant branches. Thus, the branch predictor 208 logic combines the benefits of both types of predictors (BHT 204 and PHT 206) in what is referred to as a hybrid predictor. In an exemplary embodiment, the PHT is implemented as a tagged predictor. When there is more than one directional predictor, a means for choosing which predictor to use in making a prediction is needed. One way of implementing the selection is through a tagged PHT. In addition to a saturating counter, the PHT 206 includes an address tag, and the tag is a bit range of the address of the branch. So while the PHT 206 is indexed based on pattern, the tag bits associate the given PHT entry to a branch at a given address. If the tag matches, then the PHT prediction is used. If the tag does not match then the BHT prediction is used.

As indicated above, the BTB 202 stores branch instruction addresses and their target addresses and is searched for the next instruction address that contains a branch. For a predicted taken branch, the target address is provided to the IFU 210 for fetching the new target stream. In the case of a not taken prediction, the instruction stream is sequential and this is the existing fetching order that the IFU 210 uses independent of a taken prediction/redirect.

The IFU 210 fetches instructions by requesting cache lines from a local instruction cache (e.g., I-cache 212). The I-cache 212 refers to instruction cache memory local to one or more CPUs of a processing system (e.g., processor 105) and may be implemented as a hierarchical storage system with varying levels of cache from fastest to slowest (e.g., L1, L2, . . . , Ln).

In one embodiment, the LSU 230 receives the successfully decoded instructions from the IDU 220 via, e.g., the dispatch unit 225 and the I-queue 227. The LSU 230 may include an address generation component that determines operand addresses, which addresses may be calculated using information from the instruction stream. The address calculation is used by the LSU 230 to access the D-cache 232 and retrieve data from the D-cache 232 based on the operand determination, as described further herein. The D-cache 232 refers to data cache memory local to one or more CPUs of a processing system (e.g., processor 105) and may be implemented as a hierarchical storage system with varying levels of cache from fastest to slowest (e.g., L1, L2, . . . , Ln).

In an exemplary embodiment, the control unit logic 260 implements the operand fetching control processes of the control unit 120 of FIG. 1 via one or more communication paths with the pipeline system 200. The operand fetching control processes provide the ability to prioritize and reduce the D-cache 232 memory bandwidth requirements on an instruction-level basis. The processes limit the LSU's 230 ability to perform operand fetching for non-demand data. Data that must be fetched in order to execute a program is referred to as "demand data." Because the pipeline system 200 is operating in a speculative mode, there are instructions sent down the pipeline system 200 which may not be required to execute or perform the operations of a program (e.g., predicting a branch in the wrong direction and, as a result, sending instructions down the wrong stream into the pipeline). "Non-demand data" refers to the speculative instructions that are executed which are not required in order to perform the task of the program. With respect to performance, allowing a fetch to be made from the D-cache 232 will not impact system level memory/cache performance if the fetch content is in a level of cache that is closest to the processor 105 (i.e., L1 cache). An unnecessary fetch which misses the L1 cache, however, may impact system performance if it displaces an entry in the D-cache 232 that would have later been required for an instruction which is executing down the correct path of the program. The operand fetching control processes limit or control the distance in the cache hierarchy (e.g., L1, L2, L3, etc.) as to how far an operand fetch is allowed to go.

In an exemplary embodiment, the control unit logic 260 manages the operand fetching control processes of the pipeline system 200 (e.g., either directly with the pipeline system 200 or through the GCT 226). The GCT 226 contains or references all instructions, which have been dispatched, that are to be executed and updates the architected state of the system. In an exemplary embodiment, the control unit logic 260 assigns an uncertainty value to each group in the GCT 226. In an exemplary embodiment, the uncertainty value represents a number computed as a function of the branch prediction data and various scannable/programmable options. In particular, the uncertainty value computation is a function of branch prediction factoring in a source of the prediction (e.g., BHT 204 or PHT 206) and the strength of the prediction. As indicated above, the tagged PHT 206 is direction targeted to predict branches which are more difficult to predict and by definition have a lower confidence (i.e., greater certainty) than a branch predicted by the BHT 204. The strength of a branch (weak versus strong) also alludes to the confidence of a branch.

In an exemplary embodiment, uncertainty values are tracked on an instruction-level basis in the GCT 226 and are updated when a corresponding branch instruction is resolved (i.e., correct/incorrect). Upon a correct prediction resolution, the uncertainty value is set to zero for the given branch instruction or group of instructions that include the branch. On a the occurrence of a branch wrong, all younger instructions (those occurring after the branch) are flushed from the pipeline 200 as the branch has been guessed in the wrong direction or the predicted target address was incorrect. On a branch wrong, the uncertainty value of the branch also becomes zero because the resolution is now known. Uncertainty values may be implemented as a range of numbers, e.g., 0-15, whereby an uncertainty value of 0 represents a low uncertainty (i.e., a very confident branch), while an uncertainty value of 15 represents a very high uncertainty (i.e., a low confidence branch).

In one embodiment, the uncertainty value is passed from the control unit logic 260 to the IDU 220 along with the branch instruction (e.g., via a multiplexing scheme). The instructions from the I-cache 212 are forwarded in conjunction with the uncertainty values to the IDU 220 via the IFU 210 and control unit logic 260. In an alternative embodiment, the branch is not predicted by the BPL and the branch is only discovered as a result of decode. In such a case, the uncertainty value takes on a given value as a function of the type of branch (i.e., function of the instruction/opcode).

IDU 220 receives the instructions from the IFU 210 and decodes them in preparation for execution. The I-queue 227 is an instruction buffer that stores fetched instructions awaiting further processing in the pipeline 200. In an out-of-order machine, the I-Queue 227 receives content from the IDU 220, via the dispatch unit 225, in an in-order fashion; however, it can send content to the LSU 230 and the FXU 240 in an out-of-order fashion. Upon receipt in the I-queue 227, the instructions are also tracked in the GCT 226.

Tracking the instructions in the GCT 226 includes tracking the uncertainty value assigned to every entry in the GCT 226. Each entry in the GCT 226 may contain one or more instructions. Each of the instructions may or may not be a branch instruction.

The LSU 230 receives the successfully decoded instructions from the IDU 220 via the I-queue 227. The LSU 230 may include an address generation component that determines operand addresses, which addresses may be calculated using information from the instruction stream. The address calculation is used by the LSU 230 to access the D-cache 232 and retrieve data from the D-cache 232 based on the operand determination, as described further herein.

The FXU 240 performs the computational function of the instruction using data retrieved from the D-cache 232 or may perform operations directly on registers of a given processor. In an exemplary embodiment, upon the branch being resolved (with a prediction that is correct or incorrect), the uncertainty value of the branch is updated in the GCT 226 to a value of 0. This reflects the fact that the result is now known, and as such, the confidence outcome of the branch is as high as possible.

The GCT 226 is 'n' entries deep, and in each cycle of the pipeline system 200, a summation confidence weight is computed for each GCT entry based on the individual uncertainty values of all older GCT entries. The summation weight for each GCT entry is then compared to various programmable range boundary values to determine the allowable behavior for that entry. For example, there may be three range boundary values that create up to 3 distinct ranges, each of which represents one of 3 different allowable behaviors. In an exemplary embodiment, the allowable behaviors are performed in response to programmable memory access controls. The range in which a given GCT entry's summation weight falls determines the behavior of the instructions within that GCT entry. In particular, each of a number of pre-defined memory access controls specifies a manner of handling data fetching operations subject to corresponding branch instructions, and each of the pre-defined memory access controls may be associated with a range of values to which the summation weight values are compared. The memory access controls may be implemented, e.g., via a 2-bit interface 245 that is provided by the control unit logic 260 to the LSU 230. In this manner, the memory access controls may be programmable according to the interests of the entity associated with the pipeline system 200, e.g., a programmer for the computer system 101 of FIG. 1, by updating the interface 245 accordingly.

The boundary range values may be assigned to three of four states of the 2-bit interface 245. In an exemplary embodiment, the interface 245 is defined as follows:

00—normal/default processing;

01—allow the operand fetch to access a secondary level cache (e.g., L2), but block the fetch from going out to a tertiary level cache (e.g., L3), whereby the secondary level cache is closer to the processor 105 than the tertiary level cache; and 10—allow the fetch to go to logic of the secondary level cache, but do not allow the logic of the secondary level cache to process the operand fetch (e.g., it takes time and resources to send a fetch to the L2 cache, even if the fetch request is not processed by the L2 cache. If uncertainty improves, then the L2 cache may be accessed. This access (if a hit) then takes up L2-L1 bandwidth for multiple cycles for the L2 data is too much in content to be sent to the L1 D-cache 232 in a given cycle).

In an exemplary embodiment, a fourth state (represented by the interface 245 as '11') is set to cancel a given request that has been made (e.g., if a fetch is made down a path that has encountered a branch wrong and flushes the given instruction from the pipeline, then it may be ideal to cancel this D-cache 232 fetch request as it was down a path that is not required for executing the program).

In an exemplary embodiment, the '00' state represents a first range of values defined by the interface 245, the '01' state represents a second range of values defined by the interface 245, the '10' state represents a third range of values defined by the interface 245, and the '11' state represents a cancel command for a given fetch request that was made per one of the above mentioned states.

As indicated above, summation weight values are compared to range values defined by the memory access controls and are used to alter the LSU's 230 ability as to the depth of the memory hierarchy (e.g., L2, L3, etc. of D-cache 232) a given fetch is allowed to proceed prior to being held/stalled.

By tracking the summation weight values with the GCT 226, on any flush event of the pipeline system 200 that includes branch wrongs, the instructions occurring after the flush will be cleared out with the clearing of the instruction(s) from the GCT 226. Should a GCT entry be cleared that has a fetch outstanding in a non-"00" state, then the LSU 230 may be configured to cancel the fetch (or not) as per the clearing of the given instruction. Should the LSU 230 choose to not clear/cancel such a fetch, then this fetch may acquire a new state that indicates it is no longer dependent on the 2-bit interface 245 of the memory access controls.

By starting new summation weight computations every cycle in the pipeline system 200, any older instructions in the pipeline 200 which are not proceeded by a branch are not impacted by branch confidence; hence, the D-cache 232 fetches can not be held up. The first branch in the pipeline system 200 is not held up from being resolved, as such these instructions are guaranteed to complete. In this manner, while branch confidence can stall operand fetches, forward progress is guaranteed and such D-cache 232 fetches are eventually to be made/completed.

Figure 3:
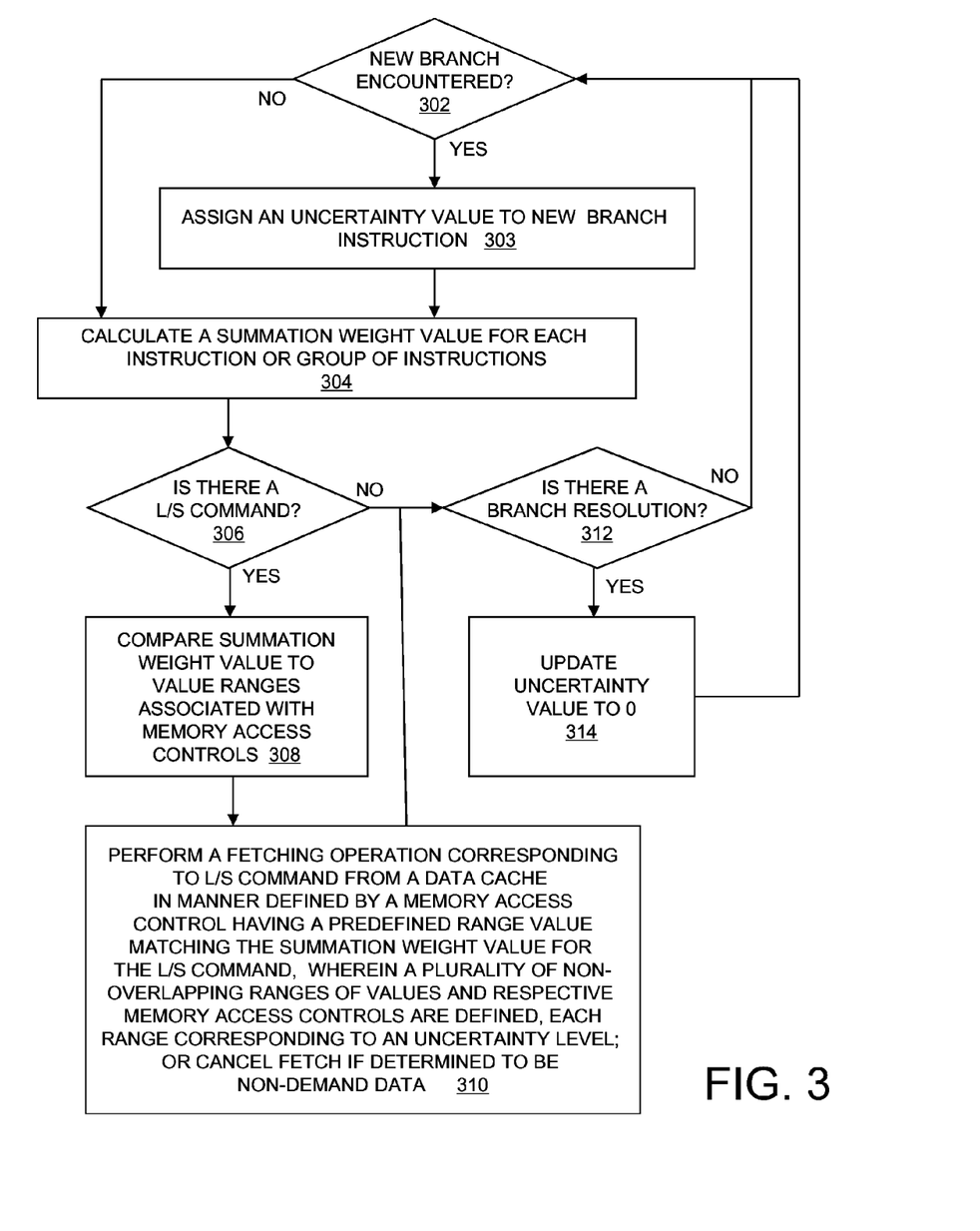
FIG. 3 is a flow diagram describing a process for implementing operand fetching control in accordance with an exemplary embodiment.

Turning now to FIG. 3 a process for implementing the operand fetching control processes will now be described in an exemplary embodiment. At step 302, it is determined whether a new branch has been encountered in the pipeline system 200, either at the time of decode or through prediction (e.g., the branch predictor 208 has generated a prediction for a branch instruction and an instruction stream (e.g., target stream if the branch is predicted taken)).

If so, at step 303, the control unit logic 260 assigns an uncertainty value to the new branch instruction and the process proceeds to step 304. If the branch is encountered through prediction, the IFU 210 forwards the branch instruction and corresponding target instruction stream (if the branch is predicted taken) along with the uncertainty value to the IDU 220. The IDU 220 decodes the branch instruction and instruction stream. If the branch is encountered at decode, and it was predicted, the branch is assigned that prediction uncertainty value. If no prediction was made, an uncertainty value is assigned to the branch as a function of the opcode of the branch that is decoded. In an out-of-order machine embodiment, upon dispatch of the instruction or group of instructions by the dispatch unit 225, the uncertainty value is tracked within the GCT entry that is allotted to the instruction or group of instructions that include the branch, as described herein. Alternatively, using an in-order machine, in lieu of a GCT 226, an uncertainty value is carried with each of the instructions as they move through the pipeline 200.

Figure 4A:
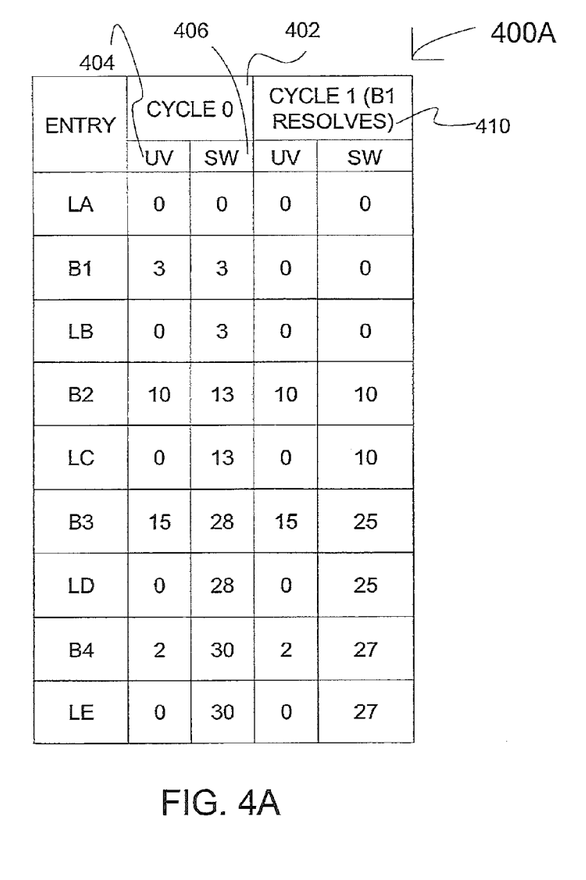
FIG. 4A and FIG. 4B illustrate global completion tables, each depicted at different cycles in a pipeline system and utilized by the operand fetching control processes in accordance with an exemplary embodiment.

Returning to step 302, if a new branch instruction has not been encountered in the pipeline system 200, or alternatively in step 303 if a new branch instruction has been encountered and an uncertainty value assigned thereto, then in step 304, in an exemplary embodiment, the control unit logic 260 calculates a summation weight value for each instruction in the GCT 226. The summation weight calculation may be made for each instruction or group of instructions in the GCT 226, or may be made for groups of entries in the GCT 226 (e.g., calculate a summation weight for each set of three entries in the GCT). This calculation may be performed at every clock cycle in the pipeline. In an alternative exemplary embodiment in which a GCT 226 is not employed, the summation weight value may be calculated for each instruction in the pipeline system 200 at each clock cycle. This calculation is illustrated and further described in FIG. 4.

At step 306, it is determined whether a load/store command has been issued (e.g., via the control unit 120/control unit logic 260) for the pipeline system 200. If so, the control unit logic 260 compares the summation weight value with value ranges associated with pre-defined memory access controls at step 308. At step 310, the LSU 230 performs the operation defined by a memory access control having a value matching the summation weight value of the instruction or group of instructions and the process proceeds to step 312.

Returning to step 306, if there is no load/store command, or alternatively, once operation defined by a memory access control has been performed at step 310, the control logic 260 determines if a branch resolution has occurred at step 312. If not, the process returns to step 302. Otherwise, the process proceeds to step 314, in which the uncertainty value is updated for the resolved branch instruction or group of instructions that include the branch instruction in the GCT 226 to a value of 0, and the process returns to step 302. This updated uncertainty value reflects the fact that the result is now known, and as such, the confidence outcome of the branch is as high as possible.

Figure 4B:
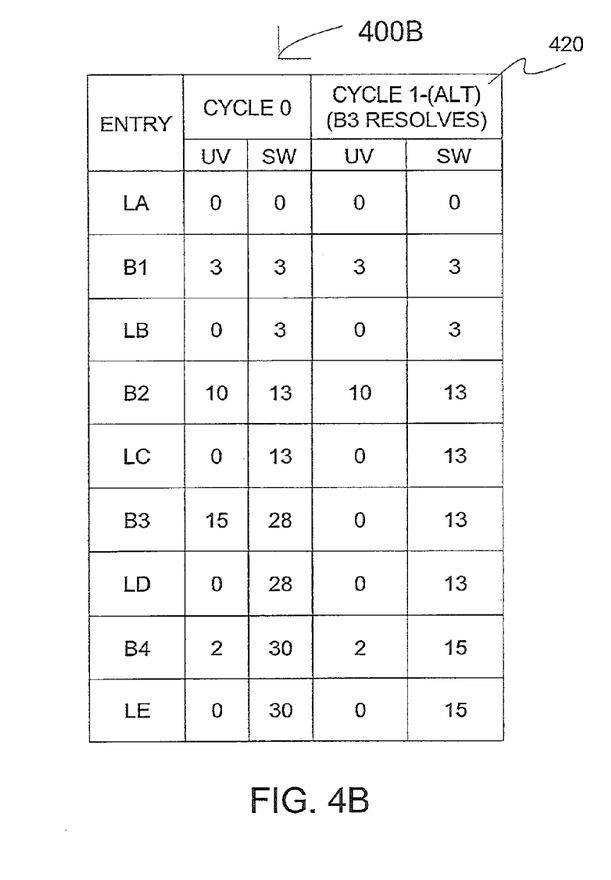

Turning now to FIGS. 4A and 4B, two GCTs 400A and 400B are depicted at different cycles in the pipeline system 200 and will now be described in an exemplary embodiment. The GCTs 400A and 400B include a number of entries each reflecting an instruction or group of instructions that include a branch instruction. The number of entries (e.g., 1 through n) corresponds to a sequence of instructions in the instruction queue 227 of the pipeline system 200. In one embodiment, and by way of non-limiting example, the first entry (e.g., LA) represents the oldest instruction in the I-queue 227, and entry n represents the newest/youngest instruction in the I-queue 227. However, it will be understood by those skilled in the art that the instructions listed in the GCT entries may not necessarily follow a chronology (i.e., first entry being older than all subsequent entries).

The GCTs 400A and 400B illustrate sample data at two different cycles (i.e., in GCT 400A, the current cycle (Cycle 0) in column 402 and Cycle 1 in which a branch (B1) has resolved in column 410; and in GCT 400B, the current cycle (Cycle 0) and an alternative Cycle 1 in which a branch (B3) has resolved in lieu of the branch B1, as shown in column 420). As illustrated in the GCTs 400A and 400B, the entries have assigned uncertainty values (UV) (column 404) and summation weight (SW) values (column 406).

By way of illustration, it can be seen in Cycle 0 (for both GCTs 400A and 400B) that branch B1 has been assigned an uncertainty value of '3,' branch B2 has been assigned an uncertainty value of '10,' branch B3 has been assigned an uncertainty value of '15,' and branch B4 has been assigned an uncertainty value of '2.' In addition, the group of instructions for each of the branches has corresponding summation weight values. In particular, the summation weight value for the group of instructions B1, LB is '3'. The summation weight value for the group of instructions B2, LC is '13'. The summation weight value for the group of instructions B3, LD is '28,' and the summation weight value for the group of instructions B4, LE is '30'.

As described above, the summation weight values are calculated by summing up the uncertainty values of each entry that contains instructions that occur earlier than the instruction for which a summation value is calculated. As shown in FIGS. 4A and 4B, for each entry in the GCT 400A and GCT 400B, an uncertainty value assigned to a given entry is summed with a cumulative summation of uncertainty values assigned to all older entries in the GCTs 400A and 400B.

As shown in Cycle 1 (column 410) of GCT 400A, an entry containing branch instruction B1 has resolved and its uncertainty value has been updated to 0. The control unit logic 260 has re-calculated the summation weight values (from those in Cycle 0) for each of the remaining entries in the GCT 400A. Thus, as shown in FIG. 4A, the summation weight value for the group of instructions B2, LC has decreased from 13 to 10; the summation weight value for the group of instructions B3, LD has decreased from 28 to 25; and the summation weight value for the group of instructions B4, LE has decreased from 30 to 27. These changes reflect that the confidence level of the respective branch instructions has increased, as they are less dependent on earlier instructions in the GCT 400A.

By way of further illustration in GCT 400B, suppose that in Cycle 1, instead of branch B1 resolving, branch B3 resolves (i.e., Cycle 1-(ALT)). As shown in column 420 of GCT 400B (Cycle 1-(ALT)), the summation weights of B1, LB and B2, LC remain the same as in the previous cycle (Cycle 0) (as they are not dependent upon B3 being resolved), while the summation weight values of B3, LD and B4, LE change from 28 to 13 and from 30 to 15, respectively.

As illustrated in FIGS. 4A and 4B, by starting new summation weight computations every cycle, when a branch resolves correctly, all younger branches (those earlier in the pipeline system 200) become more confident as the pipeline system 200 is now closer to executing the younger branch. Additionally, a branch resolution is not the only reason in which a new summation value is calculated. For example, a flush may also alter uncertainty values. A flush removes all younger instructions in the instruction stream from the point of flush. Depending upon the system design, a flush may or may not be inclusive of the instruction at the flush point.

Technical effects and benefits include the ability to prioritize and reduce data cache memory bandwidth requirements on a thread-level basis utilizing a summation weight value for each instruction or group of instructions in a computer processor pipeline (e.g., for each entry in a global completion table), which is calculated as a function of branch confidence, as well as branch resolution. The summation weight value is mapped to one of a number of pre-defined memory access controls, whereby each of the pre-defined memory access controls specifies a manner of handling data fetching operations subject to instruction path uncertainty as a function of older prediction types.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
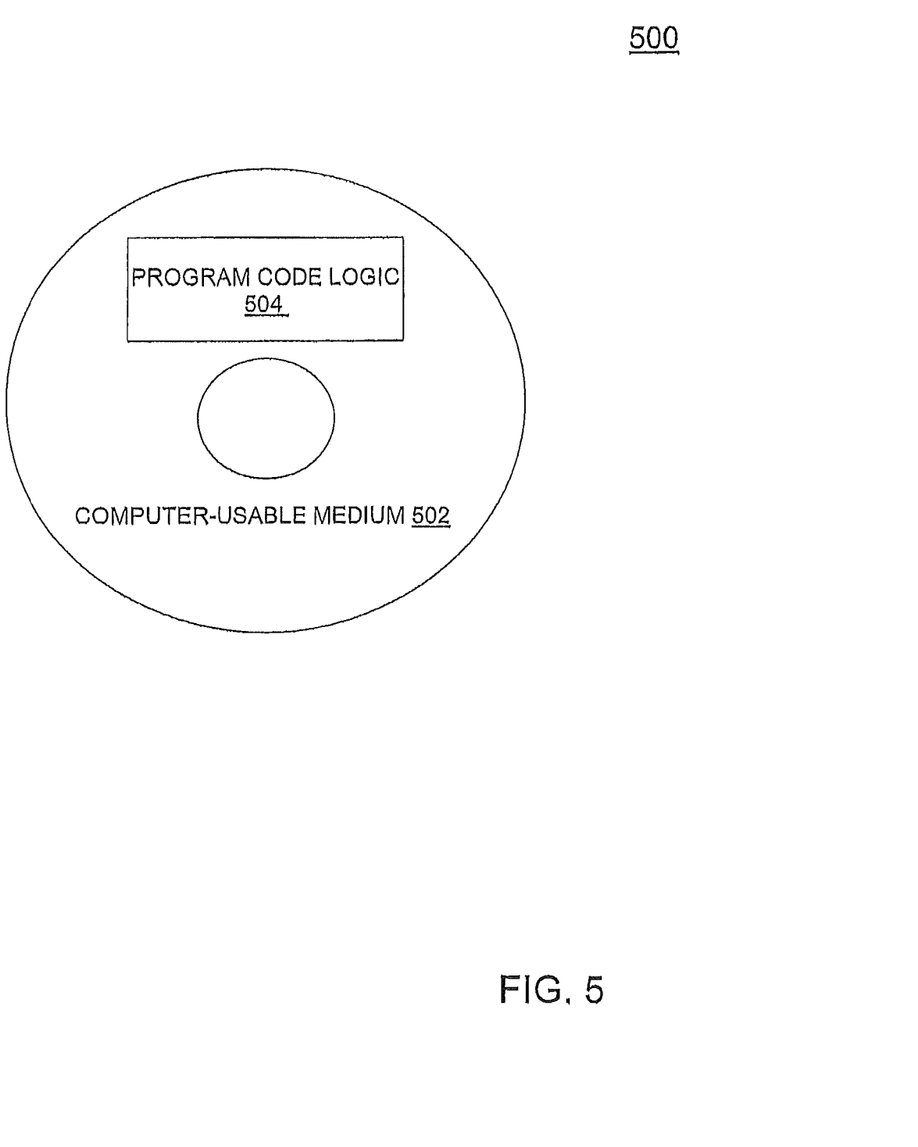
FIG. 5 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer-implemented method for operand fetching control in a computer processor pipeline of a processor having a data cache to store operands fetched by load/store instructions, the method comprising:
   calculating a summation weight value for each instruction or group of instructions in the computer processor pipeline, the summation weight value calculated as a function of branch uncertainty and a pendency in which the instruction or group of instructions reside in the computer processor pipeline relative to other instructions in the computer processor pipeline;
   mapping, by a control unit logic of the computer processor pipeline, the summation weight value of a selected load/store instruction in the computer processor pipeline that is attempting to access system memory to one of a number of distinct pre-defined ranges of summation weight values, each of the pre-defined ranges of summation weight values corresponding to a respective memory access control, each of the memory access controls specifying a different manner of handling an operand fetching operation from the data cache, wherein each manner of handling defines a respective depth in a cache hierarchy of the data cache that an operand fetch is permitted to access;
   receiving the mapped memory access control for the selected load/store instruction from the control unit logic by a load-store unit of the computer processor pipeline via an interface between the control unit logic and the load-store unit; and
   performing a memory access operation in the data cache for the selected load/store instruction based on the manner of handling the operand fetching operation that is specified by the received mapped memory access control by the load-store unit.

2. The computer-implemented method of claim 1, further comprising:
   tracking the summation weight values;
   wherein calculating the summation weight value as a function of the branch confidence comprises:
   for each instruction or group of instructions in the computer processor pipeline, summing an uncertainty value assigned to a corresponding instruction with a summation value representing a cumulative sum of uncertainty values assigned to all older instructions in the computer processor pipeline.

3. The computer-implemented method of claim 1, further comprising:
   calculating an uncertainty value that represents the branch confidence for each branch instruction or group of instructions that include the branch instruction in the computer processor pipeline, the uncertainty value calculated as a function of branch prediction logic and programmable options that include factors used in weighting predictions based on type.

4. The computer-implemented method of claim 3, further comprising:
   modifying an uncertainty value assigned to the branch instruction upon resolution of the branch instruction in the computer processor pipeline, the uncertainty value modified to reflect a high branch prediction confidence.

5. The computer-implemented method of claim 1, further comprising:
   re-calculating, at each clock cycle, the summation weight value for each instruction or group of instructions, the re-calculating comprising:
   summing an uncertainty value assigned to a corresponding branch instruction with a summation value representing a cumulative sum of uncertainty values assigned to all older instructions in the computer processor pipeline.

6. The computer-implemented method of claim 1, the memory access controls comprising:
- a first manner of handling the operand fetching operation from the data cache comprising permitting the load-store unit of the computer processor pipeline to fetch an operand according to default memory access processing based on the summation weight value falling within a first pre-defined range of values;
- a second manner of handling the operand fetching operation from the data cache comprising permitting the load-store unit of the computer processor pipeline to fetch an operand from a secondary level of cache, and blocking the load-store unit of the computer processor pipeline from fetching the operand from a tertiary level of cache when the operand is not found in the secondary level cache based on the summation weight value falling within a second pre-defined range of values, the second pre-defined range of values being distinct from the first pre-defined range of values, wherein the secondary level of cache is a level of cache that is located further away from a processor than a first level cache, and the tertiary level of cache is a level of cache that is located further away from the processor than the secondary level of cache; and
- a third manner of handling the operand fetching operation from the data cache comprising permitting the load-store unit of the computer processor pipeline to access a secondary level of cache, and preventing logic of the secondary level of cache from processing an operand fetch from the secondary level of cache based on the summation weight value falling within a third pre-defined range of values, the third pre-defined range of values being distinct from the first pre-defined range of values and the second pre-defined range of values.

7. The computer-implemented method of claim 1, the method further comprising:
- canceling a fetch request associated with the branch instruction based on an operand subject to the fetch request being determined to be non-demand data, wherein the operand is determined to be non-demand data when the operand is not needed for execution of a program issuing the fetch request.

8. The computer-implemented method of claim 6, wherein the first pre-defined range of values corresponds to lower uncertainty than the second pre-defined range of values, and wherein the second pre-defined range of values corresponds to lower uncertainty than the third pre-defined range of values.

9. The computer-implemented method of claim 1, wherein the number of pre-defined distinct pre-defined ranges of summation weight values is the same as a number of levels in the cache hierarchy of the data cache.

* * * * *